United States Patent [19]

Harris et al.

[11] 4,136,058

[45] Jan. 23, 1979

[54] HIGH EFFICIENCY CATALYSTS FOR OLEFIN POLYMERIZATION

[75] Inventors: James J. Harris, Pittsburgh; Richard E. Hammond, Irwin, both of Pa.

[73] Assignee: Arco Polymers, Inc., Philadelphia, Pa.

[21] Appl. No.: 772,794

[22] Filed: Feb. 28, 1977

[51] Int. Cl.$^2$ ............................................. B01J 31/02
[52] U.S. Cl. ........................... 252/429 B; 252/429 A; 252/429 C
[58] Field of Search ............ 252/429 A, 429 B, 429 C

[56] References Cited

U.S. PATENT DOCUMENTS

| | | | |
|---|---|---|---|
| 3,058,963 | 10/1962 | van den Berg | 252/429 C |
| 3,070,549 | 12/1962 | Ziegler et al. | 526/159 X |
| 3,196,140 | 7/1965 | Coover et al. | 252/429 B |
| 3,207,741 | 9/1965 | Schafer et al. | 252/429 B |
| 3,231,515 | 1/1966 | Ziegler et al. | 252/429 C |
| 3,245,973 | 4/1966 | Natta et al. | 252/429 C |
| 3,247,173 | 4/1966 | Shearer et al. | 252/429 A |
| 3,392,162 | 7/1968 | Ziegler et al. | 526/159 |
| 3,492,245 | 1/1970 | Calderon et al. | 252/429 B |
| 3,535,401 | 10/1970 | Calderon et al. | 252/429 B |
| 3,635,839 | 1/1972 | Eichenbaum et al. | 252/429 B |
| 3,978,031 | 8/1976 | Reginato et al. | 252/429 C |
| 4,039,472 | 8/1977 | Hoff | 252/429 C |

FOREIGN PATENT DOCUMENTS

| | | | |
|---|---|---|---|
| 639519 | 4/1962 | Canada | 252/429 A |
| 46-25854 | 7/1971 | Japan | 252/429 A |
| 967832 | 8/1964 | United Kingdom | 252/429 A |

*Primary Examiner*—Delbert E. Gantz
*Assistant Examiner*—William G. Wright
*Attorney, Agent, or Firm*—Lewis J. Young

[57] ABSTRACT

Olefin polymerization catalysts prepared by reducing transition metal compounds with an organometallic compound are rendered highly efficient by reacting excess organometallic compound with a deactivation agent, such as hydrogen chloride, prior to activation of the catalyst with organoaluminum compounds. Catalyst efficiencies of as high as 700,000 grams of polyethylene per gram of transition metal in the catalyst have been attained at reactor pressures of only 50 psig.

6 Claims, No Drawings ized compounds. Such compounds include water, alcohols, ethers, carboxylic acids, hydrogen chloride, hydrogen sulfide, hydrogen iodide, and the like. Amounts of deactivation agents less than stoichiometric with the excess of reducing organometallic compound have been found to improve the catalyst activity, but deactivation of substantially all the excess is required to give greatest activity. Excesses of deactivation agent cause a decrease in catalyst activity. When the ratio of deactivation agent to excess reducing organometallic is greater than 1.1, no catalytic activity is observed.

HIGH EFFICIENCY CATALYSTS FOR OLEFIN POLYMERIZATION

BACKGROUND OF THE INVENTION

The present invention relates to the polymerization of olefins in the presence of catalysts known in the art as ziegler catalysts.

Ziegler catalysts are commonly formed by reducing a transition metal compound with an organometallic compound. The reduced transition metal compound is then used, in conjunction with an activator, which may be the same or a different organometallic compound, to polymerize olefins, especially ethylene, in the presence of an inert solvent. A molecular weight regulator, such as hydrogen, may be used with these catalyst systems, as taught by Vandenberg in U.S. Pat. No. 3,051,690.

Ziegler et al, in U.S. Pat. No. 3,070,549 teach that catalysts can be prepared by reduction of transition metal salts with organometallic compounds of magnesium or zinc, either alone or in combination with organoaluminum compounds. Yields in the order of 500 grams of polyethylene per gram of transition metal were obtained.

Ziegler et al, in U.S. Pat. No. 3,392,162 teach that the organometallic compound used as reducing agent for the transition metal salts can be mixed complexes of organolithium and organoaluminum, organomagnesium or organozinc compounds. Similar low yields of polyethylene were obtained.

Fletcher et al, in U.S. Pat. No. 3,801,558, teach that organomagnesium compounds containing a controlled amount of an ether or amine complexing agent for the magnesium compound, when used to reduce the transition metal salts gives higher catalytic activity. Catalyst efficiencies as high as 180,000 grams of polyethylene per gram of transition metal were obtained at a pressure of over 100 psig.

BRIEF SUMMARY OF THE INVENTION

It has now been found that when organometallic compounds are used to reduce the transition metal compound to form a catalyst, which is subsequently to be activated by an organoaluminum compound to polymerize olefins, the catalyst activity is normally very low if any excess reducing organometallic compound remains in the catalyst. The catalyst activity is greatly enhanced by deactivation of the excess reducing organometallic compound subsequent to reduction of the transition metal compound and prior to use as a catalyst. The deactivation agent may be any of the known chemicals which decompose organometallic compounds, such as hydrogen chloride, water, alcohols, or combinations thereof.

DETAILED DESCRIPTION OF THE INVENTION

The catalyst of the invention comprises a reaction product from the steps of (1) reducing a transition metal compound with an excess of an organometallic compound of metals in Groups I-A and II-A or complexes of these with metals of Group III-A and (2) reacting any excess reducing organometallic compound with a deactivation agent.

The olefin polymerization process of the invention involves subjecting an alpha-olefin in an inert hydrocarbon medium, or in the gas phase, to low pressure polymerization conditions in the presence of a catalytic amount of the above described catalyst and sufficient organoaluminum compound to activate the catalyst and scavenge any undesirable impurities in the system.

The catalysts of the invention may be prepared in the polymerization reactor, but they are preferably prepared in a separate "catalyst reactor" prior to adding the catalysts to the polymerization reactor by admixing inert hydrocarbon solutions of the organometallic reducing compounds and the transition metal compound. The deactivation agents may be added to the catalyst reactor or to the polymerization reactor as long as the agent is admixed with the catalyst prior to bringing the catalyst into contact with the olefin monomers.

The inert hydrocarbon diluent used for preparing the catalyst solutions is that to be used as a reaction medium for the olefin polymerization process. Suitable inert hydrocarbons are the paraffinic and cycloparaffinic hydrocarbons having from 5 to 10 carbon atoms, such as pentane, isopentane, hexane, heptane, octane, decane, cyclopentane, cyclohexane, methylcyclohexane and aromatic hydrocarbons, such as benzene, xylene, toluene and the like. The choice of hydrocarbon may vary with the olefin to be polymerized. The use of hydrocarbons of 6 to 10 carbon atoms will reduce the pressure required for the reaction and may be preferred for safety and equipment cost considerations.

The concentration of premixed catalyst in the hydrocarbon diluent is relatively unimportant, except to the extent that the concentration is one suitable for providing the desired catalyst concentration during the polymerization process. It is convenient to prepare catalyst solutions containing 0.01–1.5 moles of transition metal compounds per liter of solution. Concentrations less than 0.01 moles/liter give lower bulk density polymers, while concentrations greater than 1.5 moles/liter give thick slurries which are difficult to stir during catalyst formation.

The organometallic compounds suitable for reducing the transition metal compounds may be the alkyl, aryl, aralkyl or alkaryl derivatives of metals of Groups I-A and II-A of the Periodic System and complexes of these alkali metal and alkaline earth metal derivatives with organometallic compounds of aluminum, magnesium, or zinc. The reductions may be carried out at temperatures between $-100°$ and $125°$ C., preferably between $-30°$ and $50°$ C. Suitable alkyl derivatives are those having 1 to 20 carbon atoms such as methyl, ethyl, propyl, and hexyl. The aryl derivatives may be exemplified by phenyl, tolyl, xylyl, and naphthyl. Examples of aralkyl groups are the benzyl and phenylethyl radicals. Especially suitable organometallic compounds in the invention are the organomagnesium compounds of formula RMgX, where R may be alkyl having 1 to 20 carbon atoms or aryl having 6 to 10 carbon atoms and X may be R, halogen, —OR. Complexes of organomagnesium compounds with organoaluminum compounds, such as $Mg[Al(C_2H_5)_4]_2$ or with ethers, such as Grignard reagents, are also especially suitable.

The amount of organometallic reducing agents used is not critical. The ratio of reducing agent to transition metal compound may vary from 0.25 to 100 or above, although ratios of from 1 to 30 are preferred. Higher ratios may be used, but are not required. There is normally an excess of organometallic compound remaining after the reduction is completed.

The deactivation agent for the excess reducing organometallic compound may be any of the chemical substances known to destroy or react with organometallic compounds. Especially suitable is anhydrous hydrogen chloride. Also suitable are water, acetic acid, alcohols, carbonic acid, phosphorus pentachloride, silicon tetrachloride, acetylene, and mixtures thereof. Other suitable substances may be the compounds known to react with organometallic compounds such as those discussed in "Grignard Reactions of Nonmetallic Substances," by Kharrasch and Reinmuth, Prentice-Hall, 1954.

The amount of deactivation agent used depends upon the quantity of organometallic compound used to reduce the transition metal compound. Sufficient agent must be used to substantially destroy any excess compound. In the case of gaseous agents, such as hydrogen chloride, it is expedient to saturate the solution of catalyst components with the gas when the catalyst is premixed in a catalyst reactor.

The transition metal compounds useful in the invention may be any compound of the metals of Groups IV-B, V-B, VI-B and XIII of the Periodic System. Typical metals of the groups are for example, titanium, zirconium, hafnium, vanadium, niobium, tantalum, chromium, molybdenum, tungsten, iron, cobalt, and nickel. Any compound of these metals such as the halides, oxyhalides, alcoholates such as the titanates of aliphatic alcohols having 1 to 6 carbon atoms in the alkyl groups, acetates, benzoates, acetylacetonates and the dicyclopentadienyl salts may be used. Especially useful are the halides and alkoxides of tetravalent titanium such as titanium tetrachloride and tetrabutyltitanate.

The activator-scavenger used in the polymerization process may be any of the organoaluminum compounds known to be useful in Ziegler polymerization systems. Especially suitable are, for example, alkylaluminums where each alkyl group has up to 16 carbon atoms, such as triethylaluminum, tri-n-propylaluminum, triisobutylaluminum, tri-hexylaluminum, diisobutyl aluminum hydride, and mixed trialkylaluminums. Those alkyls having less than 10 carbon atoms are preferred because of the greater expense and odor problems resulting from higher alkyls.

The olefins polymerizable with the catalysts and process of this invention are those mono-olefins having 2 to 8 carbon atoms, especially ethylene, propylene, 1-butene, 1-hexene, norbornene and the like. Mixtures of ethylene with up to 20 percent of these monoolefins are also suitable.

In a typical catalyst preparation by premixing the components in a reactor flask, the reduction of transition metal compound may be carried out at temperatures between $-100°$ C. and 125° C., but are preferably carried out between $-30°$ C. and 50° C. The reagents are mixed at, for example, 0° C. and, after reduction is complete, the mixture is allowed to warm up to room temperature or above and the deactivation agent for the reducing organometallic compound added. The catalyst may be used immediately or allowed to age for periods varying from 5 minutes to several days.

The polymerization of olefins is conveniently carried out in an autoclave or other suitable pressure apparatus. The apparatus is charged with solvent, if used, and an activator-scavenger and allowed to equilibrate. The catalyst is then added and the reactor pressured with olefin and a molecular weight regulator such as hydrogen, if used. Polymerization pressures depend mainly on the limitations of the equipment used, but a normal range of pressures would be from 1 to 50 atmospheres with a preferred range of from 2 to 10 atmospheres. Temperatures of polymerization usually are from 0° C. to 150° C., preferably between 50° and 100° C. The catalyst concentration suitable for the invention are between 0.001 and 10 millimoles of transition metal per liter of solvent, preferably between 0.005 and 0.25 millimoles per liter.

The invention is further illustrated by, but not limited by, the following examples.

EXAMPLE I a. Preparation of catalyst

Catalyst was prepared in a dried, nitrogen-purged 25 ml. reactor flask equipped with a magnetic stirrer, a thermometer, and serum-capped addition ports for introduction of solutions by use of a syringe. The flask was cooled to 0° C., and 4.9 ml. of dry n-hexane, 1.0 ml. of a 0.5 M. solution of $TiCl_4$ in n-hexane, and 2.4 ml. of a 0.25 M. solution of tetrabutyltitanate (TBT) in n-hexane were added with stirring. After allowing 5 minutes for equilibration of the $TiCl_4$ and TBT, 1.5 millimoles of an organomagnesium compound [$(Et_3Al)_2 \cdot MgBu_2$, marketed by Stauffer Chemical Co. as Magala 0.5E] was added. The slurry was allowed to remain at 0° C. for 5 minutes after the completion of the addition of organomagnesium compound and then the flask was warmed to 35° C. over a 10 minute period. The slurry was then saturated with anhydrous hydrogen chloride to deactivate the excess organomagnesium compound. The catalyst was aged for one hour at 35° C. before use in the polymerization.

b. Polymerization of Ethylene

To a 1 gallon, dried, nitrogen-flushed, stirred autoclave was added 2 liters of dried n-hexane as solvent and 2.5 millimoles of triisobutylaluminum as activator-scavenger. The solution was stirred for 5 minutes to allow for equilibration and for scavenging of impurities. Then 1.5 ml. (containing 0.1 millimoles of Titanium) of the catalyst slurry prepared above was transferred to the autoclave via a syringe through a nitrogen-flushed port. The autoclave was sealed, heated to 50° C., pressured to 20 psig. with hydrogen and then to 50 psig. with ethylene. The polymerization temperature was adjusted to 80° C. and allowed to proceed for 2 hours, while maintaining the 50 psig. pressure by the addition of ethylene. After 2 hours, the mixture was cooled, the autoclave vented and discharged and the slurry filtered. The polymer was dried to give 370.5 g. of a fine white powder of melt index 14.3 g./10 minutes under an applied weight of 2160 g. at 190° C. (ASTM-1238) and a bulk density of 16.7 pounds per cubic foot (pcf.). The catalyst efficiency was 77,350 g. PE/g.Ti.

c. Comparative polymerization A

A catalyst was prepared exactly as in Ia. except that the final addition of hydrogen chloride was omitted.

Polymerization of ethylene under the conditions of Ib. gave only 1.2 g. of polyethylene. The catalyst efficiency in the absence of hydrogen chloride was only 125 g. PE/g.Ti.

d. Comparative polymerization B

A catalyst was prepared exactly as in Ia. The polymerization of ethylene was carried out as in Ib except the triisobutylaluminum was replaced by 2.5 millimoles of the same Magala 0.5E used to prepare the catalyst. This time, after 2 hours, essentially no polyethylene had formed.

Thus, the comparative polymerization Ic and Id show the importance of destroying any excess alkyl-magnesium compound after the reduction of the titanium compound and before use of the catalyst to polymerize the ethylene.

EXAMPLE II

To illustrate that the deactivation agent for the excess organomagnesium compound can be added in the polymerization autoclave rather than in the catalyst flask, the following was carried out:

A catalyst was prepared as in Example Ia except that the hydrogen chloride was omitted. As before, the catalyst had a TBT/TiCl$_4$ ratio of 1.2, a Mg/Ti ratio of 1.5 and a titanium content of 0.1 millimoles per 1.5 ml. of catalyst solution.

To an autoclave was added 2 liters of n-hexane solvent, 2.5 millimoles of trihexylaluminum as activator-scavenger, and the solution stirred for 5 minutes. Then 1.5 ml. of the catalyst solution was added and 2.5 mm of hydrogen chloride to decompose any excess organomagnesium compound in the catalyst. The autoclave was pressured to 20 psig. with hydrogen and finally to 50 psig. with ethylene. After 2 hours at 80° C., the reactor was vented and the product worked up to give 420 g. of polyethylene having a melt index of 2.87 g./10 minutes at 2160 g. load at 190° C., and a bulk density of 11.5 pcf. The catalyst efficiency was 87,800 g. PE/g.Ti In the absence of the hydrogen chloride, no polymer was formed.

EXAMPLE III a. Preparation of catalyst

To a reactor flask, cooled to 0° C. as in Example 1a, was added n-hexane solvent, 0.25 M. solution of TBT in hexane, to make a solution containing the millimoles of titanium per milliliter of solution shown in Table I. To this was added sufficient di-n-hexyl-magnesium to give the magnesium to titanium (Mg/Ti) ratios shown in Table I. The stirred slurry was allowed to remain at 0° C. for 5 minutes and then warmed to 35° C. over a 10 minute period. The slurry was then saturated with anhydrous hydrogen chloride to deactivate any excess di-n-hexyl-magnesium.

b. Polymerization of ethylene

The procedure of Example Ib was repeated exactly except the hydrogen pressure was changed as indicated in the Table I. The total pressure was maintained at 50 psig. by the addition of sufficient ethylene as before throughout the 2 hour polymerization runs.

Table I

| Run No. | Ti,mm. | Mg/Ti | H$_2$ pressure psig. | Polymer g. | M.I.* g./10 min. | Catalyst efficiency g.PE/g.Ti |
|---|---|---|---|---|---|---|
| 1 | 0.1 | 2.0 | 15 | 185 | 10.40 | 38,600 |
| 2 | 0.1 | 5.0 | 3 | 707 | 0.39 | 148,000 |
| 3 | 0.1 | 5.0 | 15 | 278 | 72.10 | 57,900 |
| 4 | 0.025 | 10.0 | 10 | 489 | 2.38 | 408,100 |
| 5 | 0.025 | 10.0 | 20 | 390 | 10.83 | 325,500 |
| 6 | 0.025 | 20.0 | 20 | 497 | 17.96 | 415,000 |
| 7 | 0.01 | 30.0 | 15 | 360 | 3.77 | 751,100 |
| 8 | 0.01 | 30.0 | 20 | 343 | 9.53 | 716,900 |

*Melt index determined as in Example Ib.

EXAMPLE IV a. Preparation of catalyst

The procedure of Example Ia was followed using TBT and TiCl$_4$ in sufficient quantities to give the TBT/TiCl$_4$ ratios shown in Table II. Total titanium concentration was 0.1 mm Ti per 1.5 ml. of catalyst solution. The reducing agent, a complex dibutylmagnesium triethylaluminum having molecular formula (Bu$_2$Mg)$_6$·AlEt$_3$ (marketed by Stauffer Chemical Co. as Magala 6.5E), was used in amounts to give a Mg/Ti ratio of 5.0.

b. Polymerization of ethylene

The procedure was identical to that of Example Ib. Polymer yield, polymer melt index, and catalyst efficiency is shown in Table II.

Table II

| Run No. | TBT/ TiCl$_4$ | polymer, g. | M.I.* g./10 min. | Cat. efficiency g./g.Ti |
|---|---|---|---|---|
| 1 | 0 | 475.5 | 6.92 | 99,300 |
| 2 | 1.2 | 599.8 | 6.56 | 124,200 |
| 3 | 2.0 | 529.6 | 8.92 | 110,600 |

*Melt index determined as in Example Ib.

Similar polymerizations were run using catalyst prepared by reducing complexes of vanadium oxytrichloride/TiCl$_4$, tetrapropylzirconate/TiCl$_4$, and tetrapropylzirconate/TBT in place of the TBT/TiCl$_4$ mixture. Similar yields of polymer were obtained.

EXAMPLE V a. Preparation of catalyst

The procedure of Example 1a was followed except only TiCl$_4$ was used as heavy metal compound and di-n-hexylmagnesium was the organomagnesium compound. The Mg/Ti ratio was 5.0 and a total titanium concentration was 1 mm. Ti/30 ml. solution.

b. Polymerization of ethylene

The polymerization of ethylene was run using the procedure of Example Ib. at a catalyst concentration of 0.1 mm. Ti per 2 liters of hexane. Hydrogen pressures were varied as shown in the Table III, with total gas pressure being maintained at 50 psig. by the addition of ethylene.

Table III

| Run No. | H$_2$ pressure, psig. | Polymer yield, g. | M.I.,* g/10 min. | Cat. efficiency, g./g.Ti |
|---|---|---|---|---|
| 1 | 5 | 643.5 | 0.11 | 134,300 |
| 2** | 10 | 628.7 | 3.05 | 131,300 |
| 3 | 15 | 625.1 | 1.84 | 130,500 |
| 4 | 20 | 357.7 | 4.68 | 74,700 |
| 5 | 25 | 276.5 | 19.3 | 57.700 |

*Melt index determined as in Example Ib.
**Mg/Ti ratio was 10.0.

Example VI a. Preparation of catalyst

Catalyst was prepared by reducing a solution of TBT/TiCl$_4$ (ratio was 1.2) with Magala 0.5E (Mg/Ti was 1.5) as in Example Ia. After reduction was complete and the contents of the catalyst reactor warmed to 35° C., 3.0 millimoles (mm.) of carbon dioxide was added as deactivation agent, and the catalyst aged as before.

b. Polymerization of ethylene

An autoclave was charged with 2 liters of hexane, 2.5 mm. of triisobutylaluminum activator, 1.5 ml. of catalyst (0.1 mm. Ti) and 1.0 mm. hydrogen chloride. The reactor was then sealed and pressured to 15 psig. with hydrogen and then to 50 psig. with ethylene. Polymerization at 80° C. for 2 hours gave 217 g. of polyethylene, melt index 6.65. The catalyst efficiency was 45,300 g.PE/g.Ti.

Example VII

Three catalysts A, B, and C were prepared by reducing $TiCl_4$ with di-n-hexylmagnesium (Mg/Ti was 30) to give catalyst solutions having a total titanium concentration of 1 mm. Ti/30 ml. solution. Catalyst A was deactivated by adding 3.0 mm. of a 50/50 water/isopropanol and then saturating the solution with HCl. Catalyst B was deactivated by adding 2.0 mm. water and 5.0 mm. HCl. Catalyst C was deactivated by adding 3.0 mm. water and 3.6 mm. HCl.

Polymerizations of ethylene were run by the procedure of Example Ia using each catalyst in the concentrations shown and with a hydrogen pressure of 15 psig. and total pressure of 50 psig. as before. The results are shown in Table IV.

Table IV

| Catalyst concn., mm./2 l. hexane | Polymer, g. | Melt Index,* g/10 min. | Cat. Efficiency, g.PE/g.Ti |
| --- | --- | --- | --- |
| A, 0.01 | 199.6 | 3.45 | 416,700 |
| B, 0.04 | 171.9 | 1.09 | 89,700 |
| C, 0.022 | 158.0 | 2.47 | 150,000 |

*Melt index determined as in Example Ib.

We claim:

1. A catalyst for the polymerization of alpha-monoolefins, in the presence of an organoaluminum activator, consisting essentially of the product from the steps of (1) reacting (a) an organomagnesium compound of formula RMgX where R is alkyl having 1 to 20 carbon atoms, or aryl having 6 to 10 carbon atoms and X is R, halide or —OR or of complexes of these with organometallic compounds of aluminum or zinc, and (b) a transition metal compound selected from the group consisting of the halides, oxyhalides, alcoholates of aliphatic alcohols having 1 to 6 carbon atoms in the alkyl groups, acetates, benzoates, acetyl-acetonates and the dicyclopentadienyl salts of metals in Groups IV-B, V-B, VI-B, and VIII of the Periodic System in a ratio of (a) to (b) of between 0.25:1 and 100:1 and (2) deactivating any excess organomagnesium compound (a) with a deactivation agent for organomagnesium compounds; said deactivation agent being selected from the group consisting of hydrogen chloride, hydrogen bromide, water, acetic acid, alcohols, carbonic acid, phosphorus pentachloride, silicon tetrachloride, acetylene, and mixtures thereof.

2. The catalyst of claim 1 wherein said transition metal compound is a compound of titanium.

3. The catalyst of claim 1 wherein said transition metal compound is a compound of zirconium.

4. The catalyst of claim 1 wherein said transition metal compound is a compound of vanadium.

5. The Catalyst of claim 4 wherein said titanium compound is selected from the group consisting of titanium tetrachloride, tetrabutyltitanate, and mixtures thereof.

6. A method for the preparation of a catalyst for the polymerization of olefins which consists of reducing a transition metal compound selected from the group consisting of the halides, oxyhalides, alcoholates of aliphatic alcohols having 1 to 6 carbon atoms in the alkyl groups, acetates, benzoates, acetylacetonates, and the dicyclopentadienyl salts, with an organomagnesium compound and then deactivating the excess organomagnesium compound with a deactivation agent therefore selected from the group consisting of hydrogen chloride, hydrogen bromide, water, acetic acid, alcohols, carbonic acid, phosphorus pentachloride, silicon tetrachloride, acetylene, and mixtures thereof; said transition metal being selected from the metals of Groups IV-B, V-B, VI-B, and VIII of the Periodic System, and said organomagnesium compound being selected from the group consisting of compounds of formula RMgX where R is alkyl having 1 to 20 carbon atoms, or aryl having 6 to 10 carbon atoms and X is R, halide or —OR and complexes of RMgX with organometallic compounds of aluminum or zinc.

* * * * *